United States Patent
Fujii et al.

(10) Patent No.: US 8,818,644 B1
(45) Date of Patent: Aug. 26, 2014

(54) APPARATUS FOR DETERMINING A SEAT OCCUPANCY

(71) Applicant: Aisin Seiki Kabushiki Kaisha, Kariya (JP)

(72) Inventors: Hiroyuki Fujii, Kariya (JP); Takahiro Izuno, Kariya (JP); Isao Honda, Anjo (JP); Yoshiaki Tomatsu, Kariya (JP); Yusuke Takahashi, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/798,381

(22) Filed: Mar. 13, 2013

(51) Int. Cl.
*B60R 21/015* (2006.01)
*B60R 21/16* (2006.01)
*B60N 2/00* (2006.01)

(52) U.S. Cl.
CPC .............. *B60R 21/015* (2013.01); *B60N 2/002* (2013.01); *B60R 21/16* (2013.01); *B60R 2021/01516* (2013.01)
USPC .......................................................... 701/45

(58) Field of Classification Search
CPC ............................................. B60W 2040/0881
See application file for complete search history.

(56) References Cited

U.S. PATENT DOCUMENTS

2004/0068356 A1* 4/2004 Sakai et al. ..................... 701/45

FOREIGN PATENT DOCUMENTS

JP 9-207638 8/1997

* cited by examiner

*Primary Examiner* — John R Olszewski
*Assistant Examiner* — David Merlino
(74) *Attorney, Agent, or Firm* — Oblon, Spivak, McClelland, Maier & Neustadt, L.L.P.

(57) ABSTRACT

A seating determination apparatus includes a transition processing unit 29 configured to make a transition of the state between a first seating determination state in which an airbag apparatus is brought into an operation-permitted state and the second seating determination state in which the airbag apparatus is in the operation-prohibited state when a transition condition on the basis of a magnitude relationship between a seat load and a preset threshold value is satisfied, and configured to prohibit the transition of the state between the first seating determination state and the second eating determination state when the direction of variation of the seat load is determined to have inverted before a predetermined time set in advance has elapsed from a time point when the transition condition is satisfied.

5 Claims, 8 Drawing Sheets

APPARATUS FOR DETERMINING A SEAT OCCUPANCY

TECHNICAL FIELD

This disclosure relates to a seating determination apparatus.

BACKGROUND DISCUSSION

There is a related art relating to a seating determination apparatus configured to determine a seating state of a vehicle seat in comparison of a seat load on the basis of outputs from load sensors configured to detect a load of a passenger or the like seated on a seat cushion portion of the vehicle seat with a predetermined threshold value (For example, see JP 9 207638A).

The positions of installation of the load sensors are two positions out of four corners of the seat cushion portion which are apart from each other in the fore-and-aft direction and the left-and-right direction of a vehicle, which are minimum required positions including one position on the rear side. The two positions include the front and the rear in the same left-and-right direction, or the front and the rear in the direction of diagonal lines of a square formed by connecting the four corners.

The seating state of the vehicle seat determined by the seating determination apparatus is used for controlling an operation of an airbag apparatus. In other words, the airbag apparatus is controlled to be an operation-permitted state when it is determined to be an adult-seated state, which is a state in which an adult is seated on a vehicle seat for a passenger seat, and to be an operation-prohibited state when it is determined that no passenger is seated on the vehicle seat or to be a child-seat-fixed state in which a child is seated on a child seat.

In recent years, vehicles are becoming more multifaceted toward higher comfort, and as regards a reclining mechanism configured to change the angle of a seatback portion of a seat or a lifter mechanism configured to change the height of the seat cushion portion, for example, to be mounted on the vehicle seat, the seatback portion or a headrest portion, which are movable portions of the seat, have wider movable ranges in a vehicle cabin. As a result of lowering of a vehicle height in order to reduce a traveling resistance, a ceiling portion in the vehicle cabin is also lowered.

However, determining the seating state on the vehicle seat simply in accordance with a seat load on the basis of a load applied on a rear portion of the seat cushion portion of the vehicle seat is often associated with a problem. As described above, since the movable range of the vehicle seat is increased, interference areas in which the vehicle seat interferes with interior members disposed in the vehicle cabin are also increased. Therefore, if the height of the seat cushion portion is increased by the operation of the lifter mechanism which is capable of changing the height of the seat cushion portion after it is determined that no passenger is seated on the vehicle seat or to be a child-seat-fixed state in which a child is seated on a child seat for example, since the height of the headrest portion located on a top portion of the seat is also increased and, when the seatback portion of the seat is moved toward an upright position by the operation of the reclining mechanism which is capable of changing the angle of the seatback portion, the height of the headrest portion located above the seatback portion is also increased. Consequently, the headrest portion interferes with a ceiling inner wall member, which is the interior member, arranged on the ceiling portion of a cabin and is pushed against the ceiling inner wall member, so that a compression load acts on the load sensor located on the rear portion. In this case, on the vehicle seat, since the compression load corresponds to an increased load, the seat load is increased beyond a threshold value, and hence it may be determined that the state is transferred from the child-seat-fixed state (the airbag apparatus is in an operation-prohibited state) to an adult-seated state (the airbag apparatus is in an operation-permitted state) erroneously even though an adult is not seated.

In a case where the seatback portion of the seat is reclined rearward by the operation of the reclining mechanism after the determination as the adult-seated state, the headrest portion located above the seatback portion interferes with a seat cushion portion of a rear seat, and is pushed against the seat cushion portion so that a tensile load acts on the load sensor on the rear portion. In this case, in the vehicle seat, since the tensile load corresponds to a reduced load, the seat load is increased beyond the threshold value, and hence it may be determined that the state is transferred from the adult-seated state (the airbag apparatus is in the operation-permitted state) to the child-seat-fixed state (the airbag apparatus is in the operation-prohibited state) erroneously even though the adult is seated.

Therefore, a seating determination apparatus configured so as not to be associated with drawbacks as described above is desired.

SUMMARY OF THE INVENTION

A seating determination apparatus disclosed here includes a load detector configured to be arranged below a vehicle seat having a movable member movable in a movable range which may interfere with an interior member arranged in a vehicle cabin and configured to detect a load applied from the vehicle seat;

a seat load deriving unit configured to derive a seat load acting on the vehicle seat on the basis of a load detected by the load detector; and a transition processing unit configured to make a transition of the state between a first seating determination state in which an airbag apparatus mounted on a vehicle is brought into an operation-permitted state and the second seating determination state in which the airbag apparatus is in the operation-prohibited state when a transition condition on the basis of a magnitude relationship between the seat load and a preset threshold value is satisfied, and configured to prohibit the transition of the state between the first seating determination state and the second seating determination state when the direction of variation of the seat load is determined to have inverted before a predetermined time set in advance has elapsed from a time point when the transition condition is satisfied.

DETAILED DESCRIPTION

Figure 1:
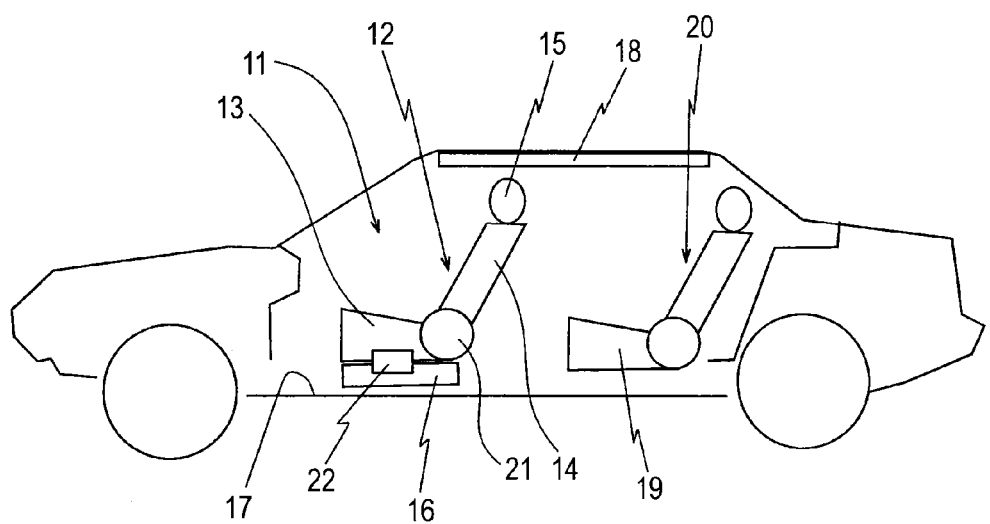
FIG. 1 is a simplified cross-sectional explanatory drawing illustrating a vehicle cabin in which a seating determination apparatus is arranged and describing an embodiment disclosed here.

Referring now to the drawings, an embodiment disclosed here will be described below. As illustrated in FIG. 1, a vehicle seat 12 located on a passenger seat in a vehicle cabin 11 includes a seat cushion portion 13 on which a passenger (not illustrated) is seated or a child seat (not illustrated) is fixed, a seatback portion 14 mounted on a rear end portion of the seat cushion portion 13 and serving as a seatback for the passenger, and a headrest portion 15 mounted on an upper end of the seatback portion 14 and configured to support a head portion of the passenger. The vehicle seat 12 is installed on a floor portion 17 of the vehicle cabin 11 so as to be capable of adjusting the position thereof in the fore-and-aft direction of the vehicle cabin 11 via a seat track 16. The position of the passenger seat which corresponds to the vehicle seat 12 is located on the left side of the vehicle cabin 11 in the case of a vehicle having a steering wheel on the right side, and on the right side of the vehicle cabin 11 in the case of a vehicle having the steering wheel on the left side. In this embodiment, the vehicle seat 12 is described as the passenger seat of the vehicle having the steering wheel on the left side.

Referring now to FIG. 1, a ceiling inner wall member 18 is disposed on a ceiling portion of the vehicle cabin 11 above the headrest portion 15, and the ceiling inner wall member 18 corresponds to an interior member described in Claims. A rear seat 20 having a seat cushion portion 19 is provided on the rear side of the vehicle seat 12, and the seat cushion portion 19 corresponds to an interior member described in Claims.

The seatback portion 14 of the vehicle seat 12 is movable, that is, allows to be changed in angle by moving toward an upright position or reclining by being rotated about a pivotally fit position with respect to the seat cushion portion 13, and is driven by a publicly known reclining mechanism 21 (see FIG. 1). The reclining mechanism 21 may employ a power system activated by using power of a motor or the like. The seatback portion 14 of the vehicle seat 12 corresponds to a movable member described in Claims.

The seat cushion portion 13 is movable, that is, allows to be changed in height of the seat cushion portion 13, and is driven by a publicly known lifter mechanism 22. As illustrated in FIG. 1, the lifter mechanism 22 is provided between the seat track 16 and the seat cushion portion 13. The lifter mechanism 22 may employ the power system operated by using power of a motor or the like. The headrest portion 15 also has a coupling relationship with the seat cushion portion 13, and the height of the headrest portion 15 changes in accordance with the operation of the lifter mechanism 22. The headrest portion 15 of the vehicle seat 12 corresponds to the movable member described in Claims.

A load detector 23 configured to detect a load applied downward on the seat cushion portion 13 by the passenger seated on the vehicle seat 12 or the child seat or the like placed thereon is installed in a form of being integrated in the interior of the vehicle seat 12 as publicly known.

Figure 2:
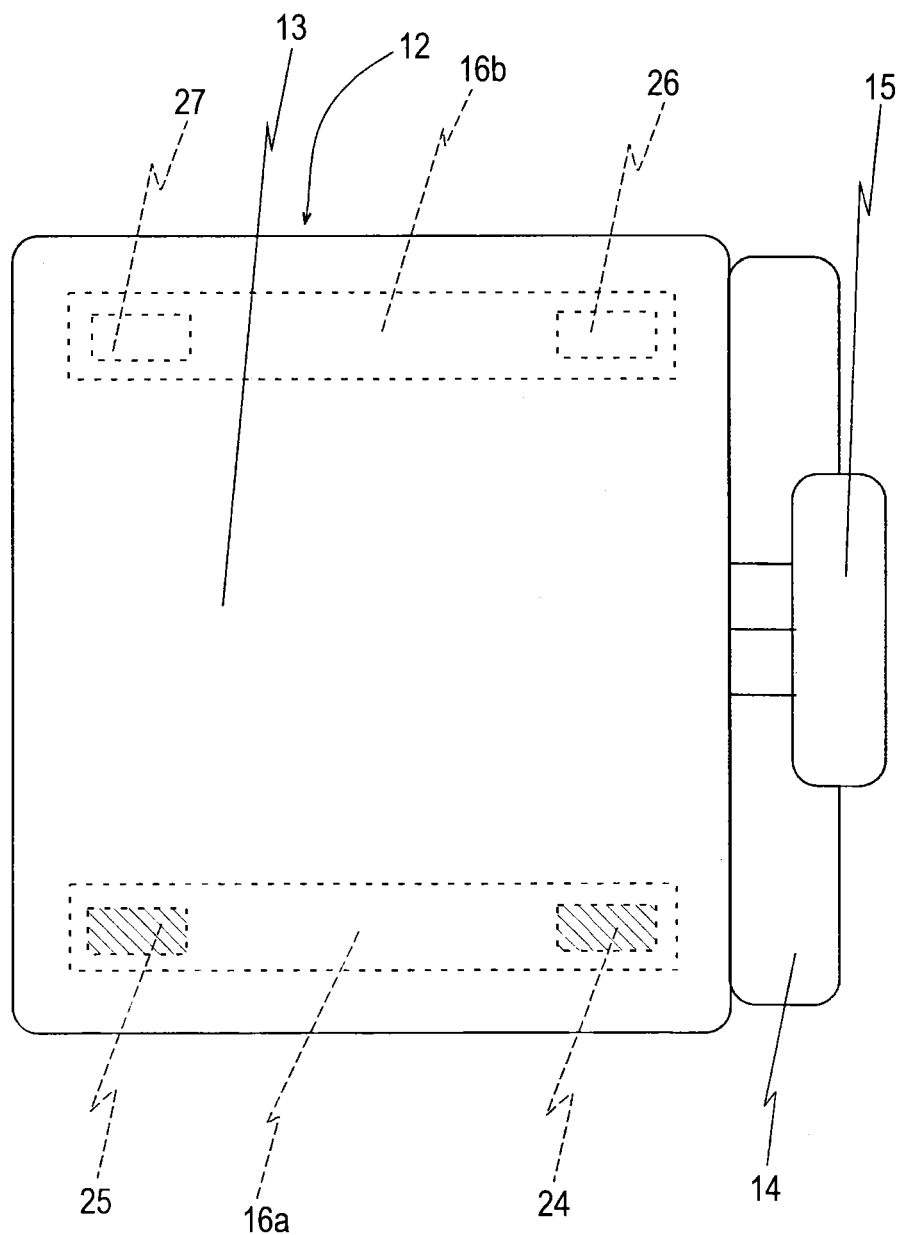
FIG. 2 is a schematic explanatory plan view illustrating an arrangement of a load sensor of a load detector.

The seat track 16 used for installing the vehicle seat 12 on the floor portion 17 of the vehicle cabin 11 includes two parts arranged below the seat cushion portion 13 of the vehicle seat 12 and extending in the fore-and-aft direction apart from each other in the direction of the width of the vehicle seat 12, and includes a first seat track 16a located on the side opposite to the door side of the vehicle seat 12, that is, inside the vehicle seat 12 and a second seat track 16b located on the door side as illustrated in FIG. 2.

The load detector 23 includes a first load detector configured to be arranged on a front portion of the vehicle seat 12 and a second load detector configured to be arranged on a rear portion of the vehicle seat 12. Specifically, as illustrated in FIG. 2, a load sensor 24 disposed at a position corresponding to a rear end of the first seat track 16a in the interior of the vehicle seat 12 and a load sensor 25 disposed at a position corresponding to a front end of the first seat track 16a, the load sensor 25 corresponds to the first load detector, and the load sensor 24 corresponds to the second load detector. The load detector 23 is not limited to this example, and four sensors in total additionally including a load sensor 26 corresponding to a rear end of the second seat track 16b in the interior of the vehicle seat 12 and a load sensor 27 arranged at a position corresponding to a front end of the second seat track 16b may be arranged at positions corresponding to four corners, that is, front, rear, left and right corners of the seat cushion portion 13, or alternatively, two sensors in total, that is, the load sensor 24 and the load sensor 26 may be arranged at the left and right positions on the rear side of the seat cushion portion 13. The load sensor 27 corresponds to the first load detector, and the load sensor 26 corresponds to the second load detector. The respective sensors 24, 25, 26, and 27 are each formed of a Wheatstone bridge circuit including four strain gauges. In this embodiment, a load applied to the seat cushion portion 13 of the vehicle seat 12 detected by the load detector 23 is referred to as a seat load irrespective of whether it is a load applied by the passenger seated thereon, a load applied by the child seat placed thereon, or a load applied by an article placed thereon. The type, the mode, and the detection principle of the load sensors 24, 25, 26, and 27 of the load detector 23 are not limited to those specific ones.

Figure 3:
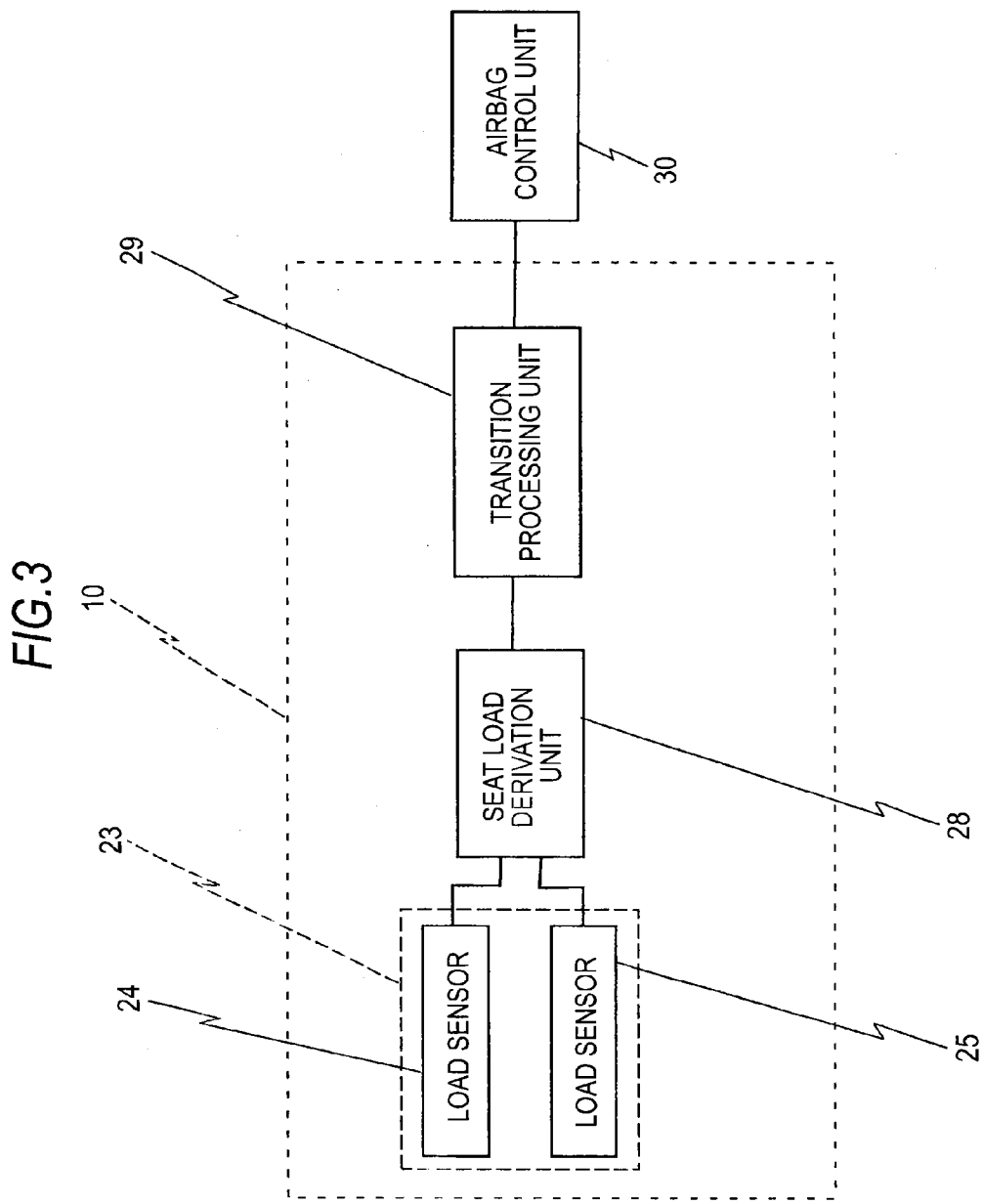
FIG. 3 is a block diagram illustrating the seating determination apparatus.

On the basis of the load detected by the load detector 23, that is, outputs from the load sensors 24 and 25, a seat load W is derived by a seat load derivation unit 28 as illustrated in FIG. 3. In other words, the seat load derivation unit 28 derives the seat load W by using Expression 1 shown below;

$$W = W24 - W25 \qquad \text{Expression 1:}$$

where, W24 represents an output from the load sensor 24, and W25 represents an output from the load sensor 25.

Supposedly, when the load detector 23 is composed of the load sensors 26 and 27, the seat load derivation unit 28 derives the seat load W by using Expression 2 shown below;

$$W = W26 - W27 \qquad \text{Expression 2:}$$

where, W26 represents an output from the load sensor 26, and W27 represents an output from the load sensor 27.

Supposedly, when the load detector 23 is composed of the load sensors 24, 25, 26, and 27, the seat load derivation unit 28 derives the seat load W by using Expression 3 shown below;

$$W = (W24 + W26) - (W25 + W27). \qquad \text{Expression 3:}$$

Supposedly, when the load detector 23 is composed of the load sensor 24 and the load sensor 26, the seat load derivation unit 28 derives the seat load W by using Expression 4 shown below;

$$W = (W24 + W26). \qquad \text{Expression 4:}$$

The seat load W corresponds to a seat load applied downward with respect to the seat cushion portion 13. When the transition conditions are satisfied on the basis of the magnitude relationship between the seat load W and a predetermined threshold value, a transition processing unit 29 transfers the state between a first seating determination state J1 which brings the airbag apparatus (not illustrated) into an operation-permitted state and a second seating determination state J2 which brings the airbag apparatus into an operation-prohibited state. Then, the transition processing unit 29 outputs a signal which permits the operation of the airbag to an airbag control unit 30 in the first seating determination state J1, while outputs a signal which prohibits the operation of the airbag to the airbag control unit 30 in the second seating determination state J2.

Figure 4:
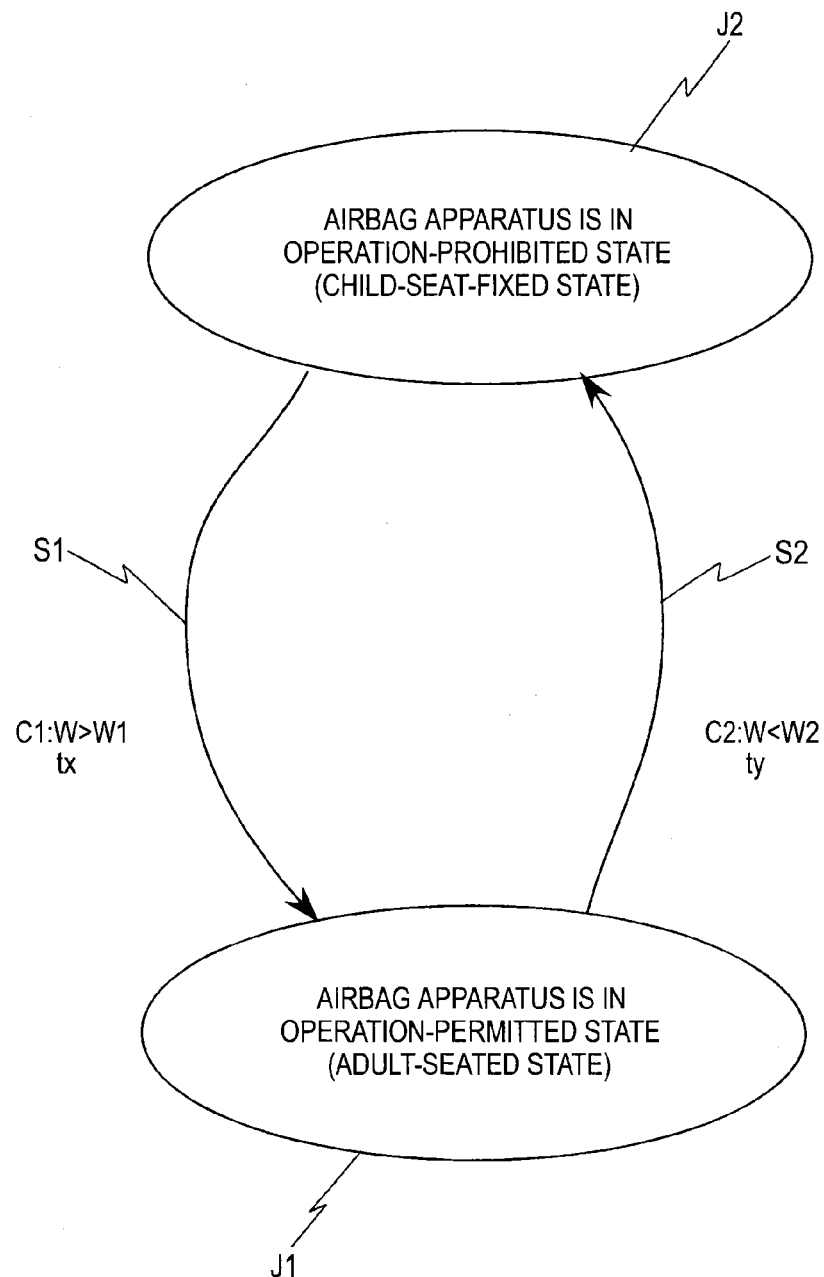
FIG. 4 is a schematic drawing for explaining transition of a seated state.

Specifically, as illustrated in FIG. 4, the first seating determination state J1 which brings the airbag apparatus into the operation-permitted state corresponds to an adult-seated state in which an adult is seated. The "adult-seated state" is a state in which an adult passenger is seated on the vehicle seat 12 and a sufficient load is applied to the seat cushion portion 13 in this embodiment. The term "adult" here refers to a passenger having an adult physical structure in terms of weight, and does not necessarily refer to an adult which is defined by law or the like. Therefore, when a passenger, even under age, being well set up in physical structure is seated on the vehicle seat 12, the state may become the "adult-seated state".

As illustrated in FIG. 4, the second seating determination state J2 which brings the airbag apparatus into the operation-prohibited state corresponds to a child-seat-fixed state. The term "child-seat-fixed state" corresponds to at least a state in which an adult is not seated such as a state in which no passenger is seated on the vehicle seat 12, or a state in which a child is seated on the child seat in this embodiment.

As illustrated in FIG. 4, the transition processing unit 29 performs a first transition process S1 and a second transition process S2, and the first transition process S1 is configured to make a transition of the state from the second seating determination state J2 in which the airbag apparatus is in the operation-prohibited state (the child-seat-fixed state) to the first seating determination state J1 in which the airbag apparatus is in the operation-permitted state (the adult-seated state) under the conditions that a seat load W larger than a first load W1 is detected for a preset time tx in the second seating determination state J2 in which the airbag apparatus is in the operation-prohibited state (the child-seat-fixed state) (hereinafter, referred to as a "first transition condition C1") when the first transition condition C1 is satisfied.

In contrast, the second transition process S2 is configured to make a transition of the state from the first seating determination state J1 in which the airbag apparatus is in the operation-permitted state (the adult-seated state) to the second seating determination state J2 in which the airbag apparatus is in the operation-prohibited state (the child-seat-fixed state) under the conditions that a seat load W smaller than a second load W2 which is smaller than the first load W1 is detected for a preset time ty in the first seating determination state J1 in which the airbag apparatus is in the operation-permitted state (the adult-seated state) (hereinafter, referred to as a "second transition condition C2") when the first transition condition is satisfied.

When the variation of the seat load W is monitored and the first transition condition C1 or the second transition condition C2 is satisfied, the transition processing unit 29 prohibits the transition of the state between the first seating determination state J1 in which the airbag apparatus is in the operation-permitted state (the adult-seated state) and the second seating determination state J2 in which the airbag apparatus is in the operation-prohibited state (the child-seat-fixed state) when the direction of variation of the seat load W is inverted before the predetermined time set in advance has elapsed from a time point when the transition condition is satisfied.

When the direction of variation of the seat load W is inverted and the inclination of variation of the seat load W after the inversion is larger than the inclination of variation of the seat load W before the inversion, the transition processing unit 29 is also capable of prohibiting the transition of the state between the first seating determination state J1 in which the airbag apparatus is in the operation-permitted state (the adult-seated state) and the second seating determination state J2 in which the airbag apparatus is in the operation-prohibited state (the child-seat-fixed state).

The seating determination apparatus 10 of this embodiment includes the above-described load detector 23 and the seat load derivation unit 28 in addition to the transition processing unit 29 as illustrated in FIG. 3.

Subsequently, in the second seating determination state J2 in which the airbag apparatus is in the operation-prohibited state (the child-seat-fixed state), the change of the seat load W in a case where the reclining mechanism 21 is operated to move the seatback portion 14 forward to the upright position will be described on the basis of a curved line A indicated in FIG. 5. A curved line B indicated in FIG. 5 shows a change of the seat load W in a case where an adult is seated in the second seating determination state J2 in which the airbag apparatus is in the operation-prohibited state (the child-seat-fixed state).

Figure 5:
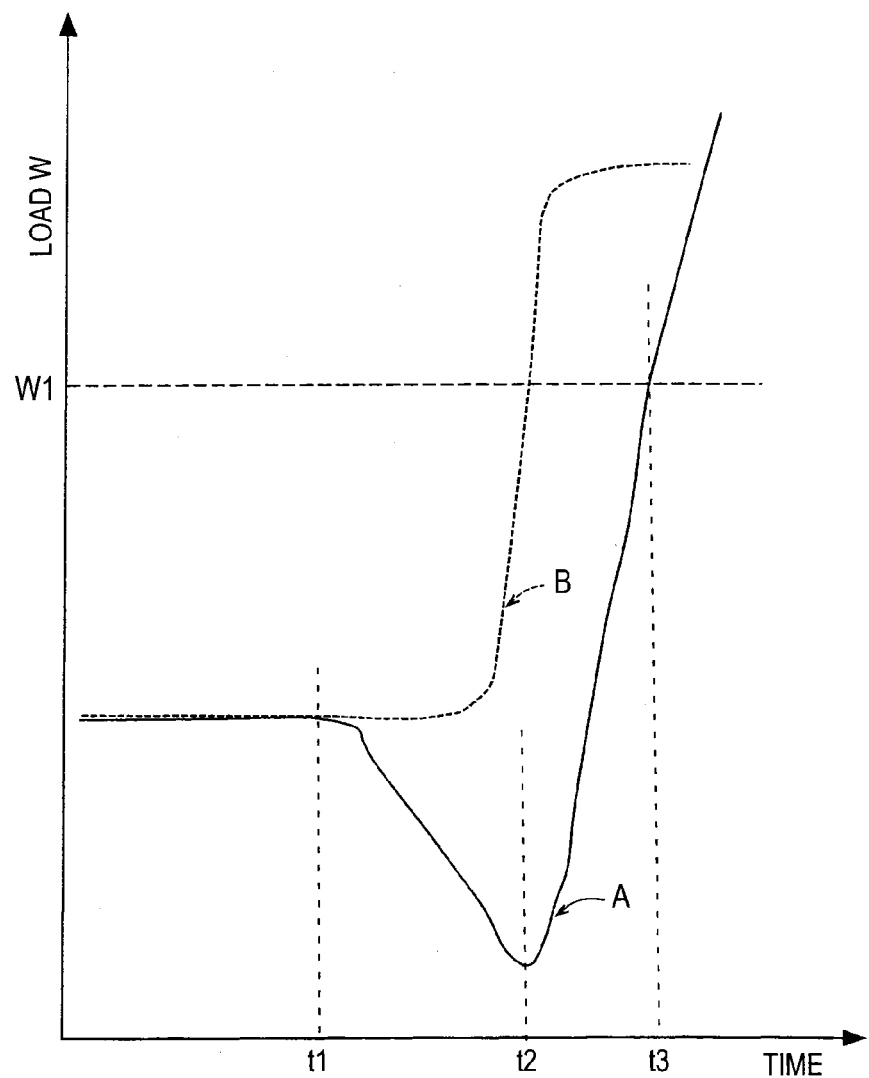
FIG. 5 is an explanatory drawing illustrating a change of a seat load in a case where a headrest portion of a seat interferes with a ceiling inner wall member.

The seat load W is a load corresponding to the second seating determination state J2 in which the airbag apparatus is in the operation-prohibited state (the child-seat-fixed state) until a time t1 when the seatback portion 14 starts an action to move toward the upright position, while the seat load W is reduced as indicated by the curved line A in FIG. 5 after the time t1 has elapsed because the center of gravity of the load applied to the seat cushion portion 13 moves forward as the movement of the seatback portion 14 toward the upright position.

Then, associated with the movement toward the upright position of the seatback portion 14, the headrest portion 15 located at a top portion of the seatback portion 14 interferes with the ceiling inner wall member 18 at a time t2, comes into contact with the ceiling inner wall member 18, and is pressed against the ceiling inner wall member 18. After the time t2 has elapsed, the seat load W is converted into a compression load and is increased as the headrest portion 15 is pressed against the ceiling inner wall member 18, that is, the direction of the load variation of the seat load W is inverted and increases as indicated by the curved line A in FIG. 5. At a time t3 a predetermined period after the time t2, the seat load W increases beyond the first load W1 in the first transition condition C1 in which the state is transferred from the second seating determination state J2 in which the airbag apparatus is in the operation-prohibited state (the child-seat-fixed state) to the first seating determination state J1 in which the airbag apparatus is in the operation-permitted state (the adult-seated state) even though no adult is seated on the seat cushion portion 13 in fact and, in addition, the preset time tx has elapsed and the first transition condition C1 is satisfied.

The inclination of the variation of the seat load W after the time t2 at which the direction of the load variation is inverted is larger than that in the period from t1 to t2 before the inversion of the direction of variation as indicted by the curved line A in FIG. 5. It is because the pressing strength of the headrest portion 15 against the ceiling inner wall member 18 is increased in comparison with the variation of the seat load in a case where the headrest portion 15 does not interfere with the ceiling inner wall member 18 in the case of the operation of the reclining mechanism 21. Also, in a case where the height of the seat cushion portion 13 is increased by operating the lifter mechanism 22, the center of gravity of the load applied to the seat cushion portion 13 is moved forward as in the case where the seatback portion 14 is moved toward the upright position by the operation of the reclining mechanism 21, and hence the headrest portion 15 is operated in the same manner and the variation of the seat load W is as indicated by the curved line A in FIG. 5.

In a case of the state indicated by the curved line A in FIG. 5, that is, in the second seating determination state J2 in which the airbag apparatus is in the operation-prohibited state (the child-seat-fixed state), when the first transition condition C1 in which the state is transferred from the second seating determination state J2 to the first seating determination state J1 in which the airbag apparatus is in the operation-permitted state (the adult-seated state) is satisfied and when the direction of variation of the seat load W is inverted before the elapse of a predetermined time set in advance from a time point when the first transition condition C1 is satisfied, the transition processing unit 29 prohibits the transition from the second seating determination state J2 to the first seating determination state J1.

Figure 6:
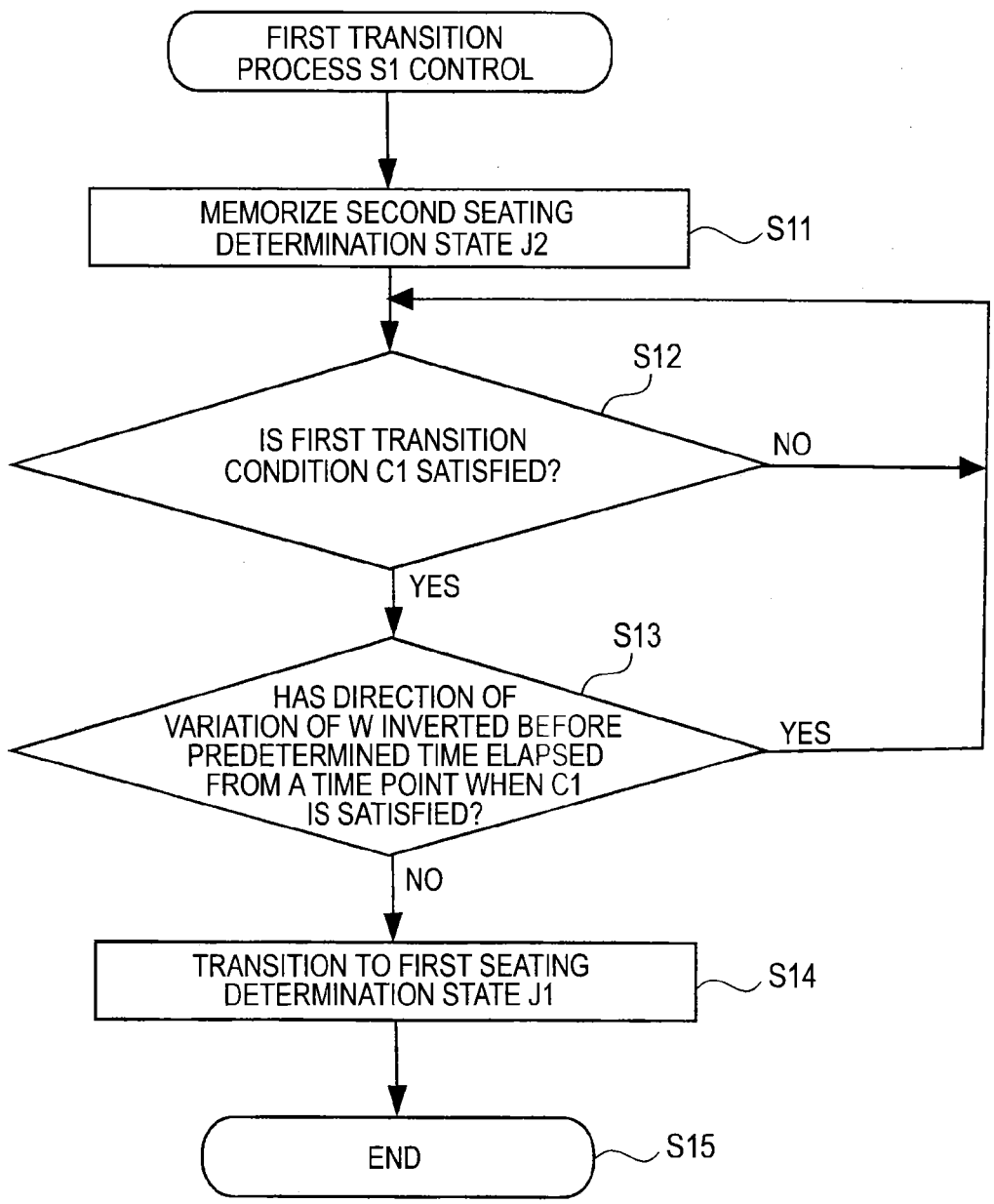
FIG. 6 is a flowchart diagram schematically illustrating an example of a first transition process control.

Subsequently, a first transition process control routine for transferring the state from the second seating determination state J2 to the first seating determination state J1 in which the airbag apparatus is in the operation-permitted state (the adult-seated state) in the first transition process S1 performed by the transition processing unit 29, that is, in the second seating determination state J2 in which the airbag apparatus is in the operation-prohibited state (the child-seat-fixed state) will be described on the basis of a flowchart in FIG. 6.

First of all, the procedure starts from a state in which the second seating determination state J2 in which the airbag apparatus is in the operation-prohibited state (the child-seat-fixed state) is memorized in Step S11. Subsequently, in Step S12, whether the seat load W satisfies the first transition condition C1 for the transition to the first seating determination state J1 is determined.

When the seat load W satisfies the first transition condition C1, the procedure goes to Step S13, where whether the direction of variation of the seat load W is inverted before the elapse of the predetermined time set in advance from the time point when the first transition condition C1 is satisfied is determined. In the determination in Step S13, as indicated by the curved line B in FIG. 5, when the direction of variation of the seat load W is not inverted as in the case where the adult is seated, the procedure goes to Step S14, where the state is transferred to the first seating determination state J1.

When the direction of variation of the seat load W is inverted as in the case where the headrest portion 15 interferes with the ceiling inner wall member 18 without an adult seated thereon as indicated by the curved line A in FIG. 5 in the determination in Step S13, the transition to the first seating determination state J1 is prohibited and the procedure goes back to Step 12. Subsequently, the first transition process S1 control routine for transferring the state from the second seating determination state J2 to the first state J1 is terminated in Step 15.

Subsequently, in the first seating determination state J1 in which the airbag apparatus is in the operation-permitted state (the adult-seated state), the change of the seat load W in a case where the reclining mechanism 21 is operated to move the seatback portion 14 rearward will be described on the basis of a curved line C in FIG. 7. The curved line D in FIG. 7 indicates a change of the seat load W in a case where an adult has gotten out of the vehicle and there is no more adult seated on the seat cushion portion 13 in the first seating determination state J1 in which the airbag apparatus is in the operation-permitted state (the adult-seated state).

Figure 7:
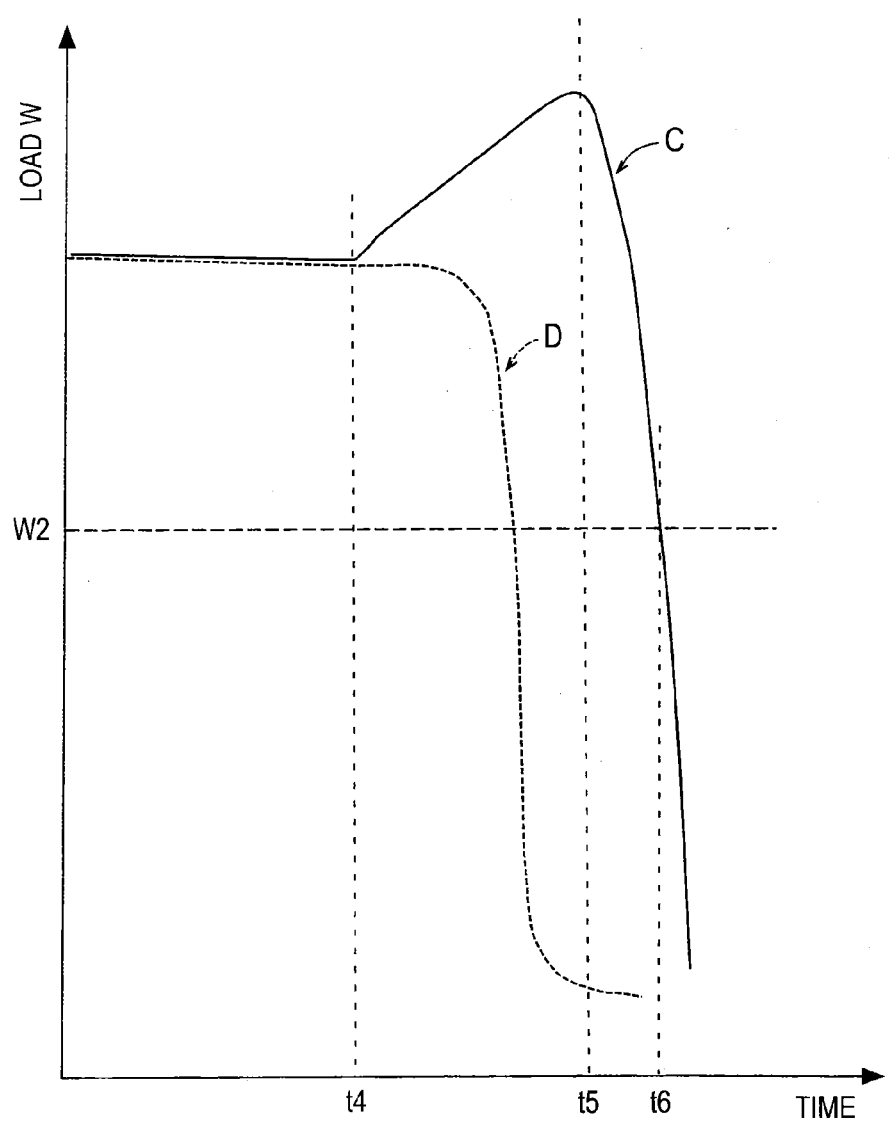
FIG. 7 is an explanatory drawing illustrating a change of a seat load in a case where a seat bag portion of the seat interferes with a cushion portion of a rear seat.

The seat load W is a load determined to be the first seating determination state J1 in which the airbag apparatus is in the operation-permitted state (the adult-seated state) until a time t4 when the seatback portion 14 starts an action to move rearward, while the seat load W is increased as indicated by the curved line C in FIG. 7 after the time t4 has elapsed because the center of gravity of the load applied to the seat cushion portion 13 moves rearward as the backward movement of the seatback portion 14.

Then, associated with the backward movement of the seatback portion 14, the headrest portion 15 located at the top portion of the seatback portion 14 interferes with the seat cushion portion 19 of the rear seat 20 at a time t5, comes into contact with the seat cushion portion 19, and is pressed against the seat cushion portion 19. After the time t5 has elapsed, the seat load W is converted into a pull-up load and is decreased as the headrest portion 15 is pressed against the seat cushion portion 19 of the rear seat 20, that is, the direction of the load variation of the seat load W is inverted and is reduced as indicated by the curved line C in FIG. 7. At a time t6, the seat load W is reduced beyond the second load W2 in the second transition condition C2 in which the state is transferred from the first seating determination state J1 in which the airbag apparatus is in the operation-permitted state (the adult-seated state) to the second seating determination state J2 in which the airbag apparatus is in the operation-prohibited state (the child-seat-fixed state) even though an adult is still seated on the seat cushion portion 13 in fact and, in addition, the preset time ty is satisfied.

The inclination of the variation of the seat load W after the time t5 at which the direction of the load variation is inverted is larger than that in the period from t4 to t5 before the inversion of the direction of variation as indicted by the curved line C in FIG. 7. It is because the pressing strength of the headrest portion 15 against the seat cushion portion 19 of the rear seat 20 is increased in comparison with the variation of the seating load in a case where the headrest portion 15 does not interfere with the seat cushion portion 19 of the rear seat 20 in the case of the operation of the reclining mechanism 21.

Figure 8:
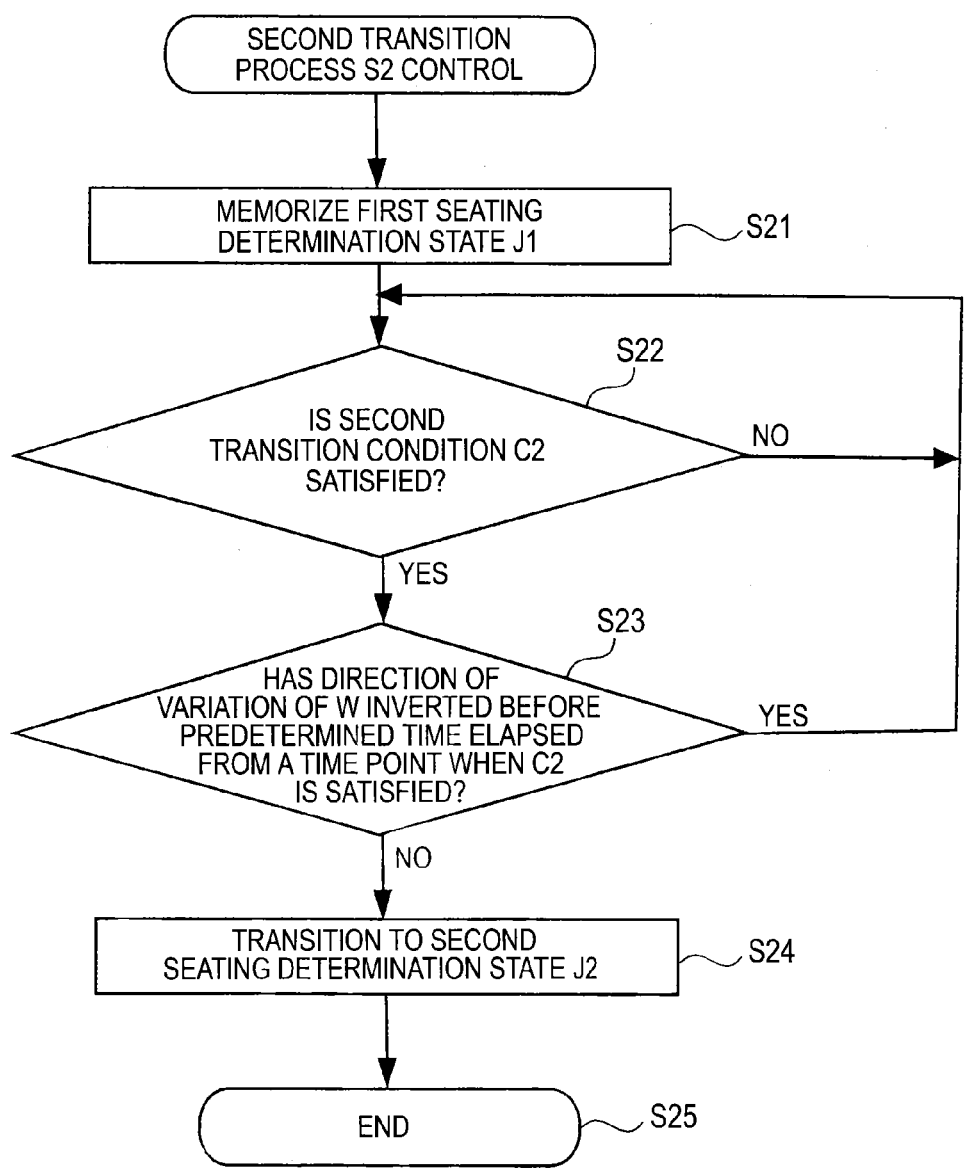
FIG. 8 is a flowchart diagram schematically illustrating an example of a second transition process control.

Subsequently, a second transition process control routine for transferring the state from the first seating determination state J1 to the second seating determination state J2 in which the airbag apparatus is in the operation-prohibited state (the child-seat-fixed state) in the second transition process S2 performed by the transition processing unit 29, that is, in the first seating determination state J1 in which the airbag apparatus is in the operation-permitted state (the adult-seated state) will be described on the basis of a flowchart in FIG. 8.

First of all, the procedure starts from a state in which the first seating determination state J1 in which the airbag apparatus is in the operation-permitted state (the adult-seated state) is memorized in Step S21. Subsequently, in Step S22, whether the seat load W satisfies the second transition condition C2 for the transition to the second seating determination state J2 is determined.

When the seat load W satisfies the second transition condition C2, the procedure goes to Step S23, where whether the direction of variation of the seat load W is inverted before the elapse of the predetermined time set in advance from the time point when the second transition condition C2 is satisfied is determined. In the determination in Step S23, as indicated by the curved line D in FIG. 7, when the direction of variation of the seat load W is not inverted as in the case where the adult has gotten out of the vehicle and the adult is no longer seated on the seat cushion portion 13, the procedure goes to Step S24, where the state is transferred to the second seating determination state J2.

When the direction of variation of the seat load W is inverted as in the case where the headrest portion 15 interferes with the seat cushion portion 19 of the rear seat 20 even though the adult remains seated as indicated by the curved line C in FIG. 7 in the determination in Step S23, the transition to the second seating determination state J2 is prohibited and the procedure goes back to Step 22. Subsequently, the second transition process S2 control routine for transferring the state from the first seating determination state J1 to the second seating determination state J2 is terminated in Step 25.

As described above, according to the seating determination apparatus 10 of this embodiment, the seating determination apparatus includes: the load detector 23 configured to be arranged below the vehicle seat 12 having the movable members 14 and 15 movable in the movable range which may interfere with the interior members 18 and 19 arranged in the vehicle cabin 11 and configured to detect a load applied from the vehicle seat 12; the seat load deriving unit 28 configured to derive the seat load W acting on the vehicle seat 12 on the basis of a load detected by the load detector 23; and the transition processing unit 29 configured to make a transition of the state between the first seating determination state J1 in which an airbag apparatus mounted on a vehicle is brought into the operation-permitted state and the second seating determination state J2 in which the airbag apparatus is in the operation-prohibited state when transition conditions C1 and C2 on the basis of a magnitude relationship between the seat load W and the preset threshold value are satisfied, and configured to prohibit the transition of the state between the first seating determination state J1 and the second seating determination state J2 when the direction of variation of the seat load W is determined to have inverted before a predetermined time set in advance has elapsed from a time point when the transition conditions C1 and C2 are satisfied. Therefore, even when the seating state is not changed, the load variation due to the interference between the movable members 14 and 15 and the interior members 18 and 19 is generated, and the transition conditions C1 and C2 are satisfied, the seating state on the vehicle seat 12 may be determined accurately.

As described above, according to the seating determination apparatus 10 of this embodiment, the transition processing unit 29 prohibits the transition of the state between the first seating determination state J1 and the second seating determination state J2 when the direction of variation of the seat load W is inverted and the inclination of variation of the seat load W after the inversion is larger than the inclination of variation of the seat load W before the inversion. Therefore, even when the seating state is not changed, the load variation due to the interference between the movable members 14 and 15 and the interior members 18 and 19 is generated, and the transition conditions C1 and C2 are satisfied, the seating state on the vehicle seat 12 may be determined further accurately.

As described above, according to the seating determination apparatus 10 of this embodiment, the load detector 23 includes the first load detectors 25 and 27 configured to be arranged on the front portion of the vehicle seat 12 and the second load detectors 24 and 26 configured to be arranged on the rear portion of the vehicle seat 12, and the seat load derivation unit 28 derives the differential values W24−W25 and W26−W27 of the loads W25 and W27 detected by the first load detectors 25 and 27 with respect to loads 24W and 26W detected by the second load detectors 24 and 26 as the seat load W. In contrast, the first load detector and the second load detector are two load sensors 24 and 25 configured to be provided on the side opposite to the door side of the vehicle seat 12. On the other hand, the first load detector includes the first load sensor and a second load sensor 25 and 27 configured to be provided apart from each other in the vehicle width direction, the second load detector includes the third load sensor and a fourth load sensor 24 and 26 configured to be provided apart from each other in the vehicle width direction, and the seat load derivation unit 28 derives a differential value (W24+W25)−(W25+W27) of the sum of loads W25+W27 detected respectively by the first load sensor and the second load sensor 25 and 27 with respect to the sum of loads W24+w26 detected respectively by the third load sensor and the fourth load sensor 24 and 26 as the seat load W. According to the respective configurations described above, by deriving the differential value of the load detected by the first load detector with respect to the load detected by the second load detector as the seat load W, for example, the direction of variation of the seat load W which varies along the direction of movement of the movable member is inverted in a case where the movable member of the vehicle seat 12 is the seatback portion 14 which is capable of being tilted by a reclining mechanism 21 and interferes with the interior member (for example, a rear seat 20) during the operation, or in a case where the movable member is the headrest portion 15 capable of moving upward and downward by a lifter mechanism 22 and interferes with the interior member (for example, the ceiling inner wall member 18) during the operation thereof. Therefore, the accuracy of identification of whether the variation of the seat load W is caused by the interference of the movable member with respect to the interior member or caused by the change of the seated state on the seat 12 may be enhanced.

As described above, according to the seating determination apparatus 10 of this embodiment, the load detector 23 corresponds to the two load sensors 24 and 26 configured to be provided apart from each other in the vehicle width direction on the rear portion of the vehicle seat 12, and the seat load derivation unit 28 is configured to derive the sum of the loads W 24 and W26 detected respectively by the two load sensors 24 and 26 as the seat load W. Therefore, even when the loads generated on the left and the right portions of the vehicle seat 12 are deviated, the change of the load is not missed.

It is apparent that characteristic portions of the respective embodiments may be combined as needed in a case where a plurality of embodiments exist unless otherwise specifically described.

Although the invention has been described with reference to the embodiment, the invention is not limited to the configuration described in the embodiment and various modes may be taken within a range described in Claims.

The invention claimed is:

1. A seating determination apparatus comprising:
   a load detector configured to be arranged below a vehicle seat having a movable member movable in a movable range which may interfere with an interior member arranged in a vehicle cabin and configured to detect a load applied from the vehicle seat;
   a seat load deriving unit configured to derive a seat load acting on the vehicle seat on the basis of a load detected by the load detector; and
   a transition processing unit configured to make a transition of a state between a first seating determination state in which an airbag apparatus mounted on a vehicle is brought into an operation-permitted state and a second seating determination state in which the airbag apparatus is in an operation-prohibited state when a transition condition on the basis of a magnitude relationship between the seat load and a preset threshold value is satisfied, and configured to prohibit the transition of the state between the first seating determination state and the second seating determination state when the direction of variation of the seat load is determined to have inverted before a predetermined time set in advance has elapsed from a time point when the transition condition is satisfied, wherein the transition processing unit prohibits the transition of the state between the first seating determination state and the second seating determination state when the direction of variation of the seat load is inverted and the inclination of variation of the seat load after the inversion is larger than the inclination of variation of the seat load before the inversion.

2. The seating determination apparatus according to claim 1, wherein the load detector includes a first load detector configured to be arranged on a front portion of the vehicle seat and a second load detector configured to be arranged on a rear portion of the vehicle seat, and the seat load derivation unit derives a differential value of a load detected by the first load detector with respect to a load detected by the second load detector as the seat load.

3. The seating determination apparatus according to claim 2, wherein the first load detector and the second load detector are two load sensors configured to be provided on the side opposite to the door side of the vehicle seat.

4. The seating determination apparatus according to claim 2, wherein the first load detector includes a first load sensor and a second load sensor configured to be provided apart from each other in the vehicle width direction, the second load detector includes a third load sensor and a fourth load sensor configured to be provided apart from each other in the vehicle width direction, and the seat load derivation unit derives a differential value of the sum of loads detected by the first load sensor and the second load sensor respectively with respect to the sum of loads detected respectively by the third load sensor and the fourth load sensor as the seat load.

5. The seating determination apparatus according to claim 1, wherein the load detector corresponds to two load sensors configured to be provided apart from each other in the vehicle width direction on the rear portion of the vehicle seat, and the seat load derivation unit derives the sum of loads detected respectively by the two load sensors as the seat load.

* * * * *